(12) United States Patent
Kaiser

(10) Patent No.: US 8,757,374 B1
(45) Date of Patent: Jun. 24, 2014

(54) CONFORMABLE COMPUTER HOLDER

(76) Inventor: Jeffrey Joseph Kaiser, Los Angeles, CA (US)

(*) Notice: Subject to any disclaimer, the term of this patent is extended or adjusted under 35 U.S.C. 154(b) by 278 days.

(21) Appl. No.: 13/109,341

(22) Filed: May 17, 2011

Related U.S. Application Data

(60) Provisional application No. 61/345,247, filed on May 17, 2010.

(51) Int. Cl.
  *B65D 85/00* (2006.01)
  *A47B 91/00* (2006.01)

(52) U.S. Cl.
  USPC ..................... 206/320; 248/346.03

(58) Field of Classification Search
  USPC .......... 206/320, 521, 522, 591–594;
           108/42–44; 248/188.2, 346.03, 346.2,
           248/363, 371, 444, 454, 917; 361/679.09,
           361/679.55, 679.56
  See application file for complete search history.

(56) References Cited

U.S. PATENT DOCUMENTS

| | | | |
|---|---|---|---|
| D24,803 S * | 10/1895 | Linn et al. ................. D6/420 |
| 2,219,974 A * | 10/1940 | Bellow ..................... 248/346.2 |
| D169,694 S | 5/1953 | Goodman et al. |
| 3,028,702 A * | 4/1962 | St Cyr .......................... 248/364 |
| 4,052,944 A * | 10/1977 | Jennings ....................... 108/44 |
| 4,537,646 A | 8/1985 | Hoyle |
| 4,788,916 A | 12/1988 | Saxton |
| 4,815,623 A | 3/1989 | Levin |
| D310,677 S | 9/1990 | Stidham et al. |
| D366,780 S | 2/1996 | Brooks |
| 5,623,869 A | 4/1997 | Moss et al. |
| 5,713,548 A | 2/1998 | Boyer et al. |
| D472,728 S | 4/2003 | Harris et al. |
| D488,816 S | 4/2004 | Tyler et al. |
| 6,856,506 B2 | 2/2005 | Doherty et al. |
| D508,916 S | 8/2005 | Lee |
| D512,245 S | 12/2005 | Bean et al. |
| D516,562 S | 3/2006 | Solomon et al. |
| D517,833 S | 3/2006 | Jennings |
| D526,810 S | 8/2006 | Lorr et al. |
| 7,281,698 B2 | 10/2007 | Patterson, Jr. |
| D609,027 S | 2/2010 | Jennings |
| D626,559 S | 11/2010 | Green |
| D627,986 S | 11/2010 | Brownlow |
| D633,504 S | 3/2011 | Alexander, Jr. |
| 7,907,400 B2 * | 3/2011 | Bekele ....................... 361/679.55 |
| 7,992,502 B1 * | 8/2011 | Davis ............................... 248/444 |
| 2002/0002935 A1 | 1/2002 | Lease et al. |
| 2005/0072893 A1 | 4/2005 | Brown |
| 2005/0121594 A1 | 6/2005 | Kuo |
| 2007/0001079 A1 | 1/2007 | Patterson |
| 2007/0051766 A1 | 3/2007 | Spencer |

(Continued)

*Primary Examiner* — Luan K Bui

(74) *Attorney, Agent, or Firm* — CreatiVenture Law, LLC; Dennis JM Donahue, III

(57) ABSTRACT

A computer holder has a protective case and a conformable backing which is attached to the case. The case holds the computer, and the backing can be formed as a soft membrane or as an accordion-like bellows. The backing is preferably made of a sewn fabric, leather and other similar soft materials, and may alternatively be made of injection molded silicone. The space within the backing can be selectively filled with small filling materials, a low viscosity fluid or a gas such as air. A two way valve, cap or handle can be attached to the backing to allow for a variation of the backing's fill level and shape. The holder can also have a strap attached to the case and a pocket formed in the backing.

20 Claims, 7 Drawing Sheets

(56) References Cited

U.S. PATENT DOCUMENTS

| | | |
|---|---|---|
| 2009/0179132 A1 | 7/2009 | Qin et al. |
| 2009/0242719 A1 * | 10/2009 | Carnevali .................. 248/346.2 |
| 2010/0084291 A1 | 4/2010 | Dayton et al. |
| 2011/0056413 A1 * | 3/2011 | Andochick .................. 248/444 |

* cited by examiner

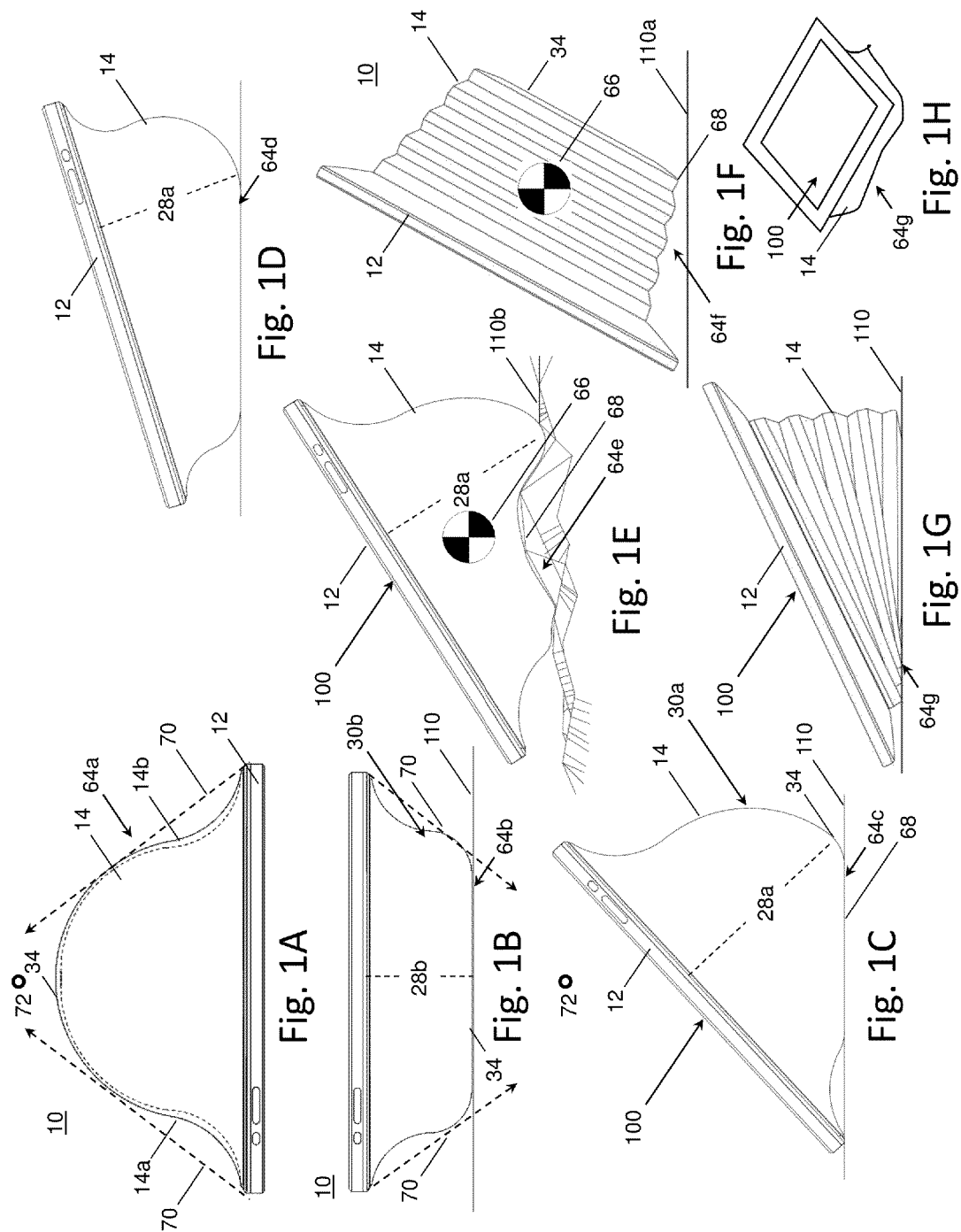

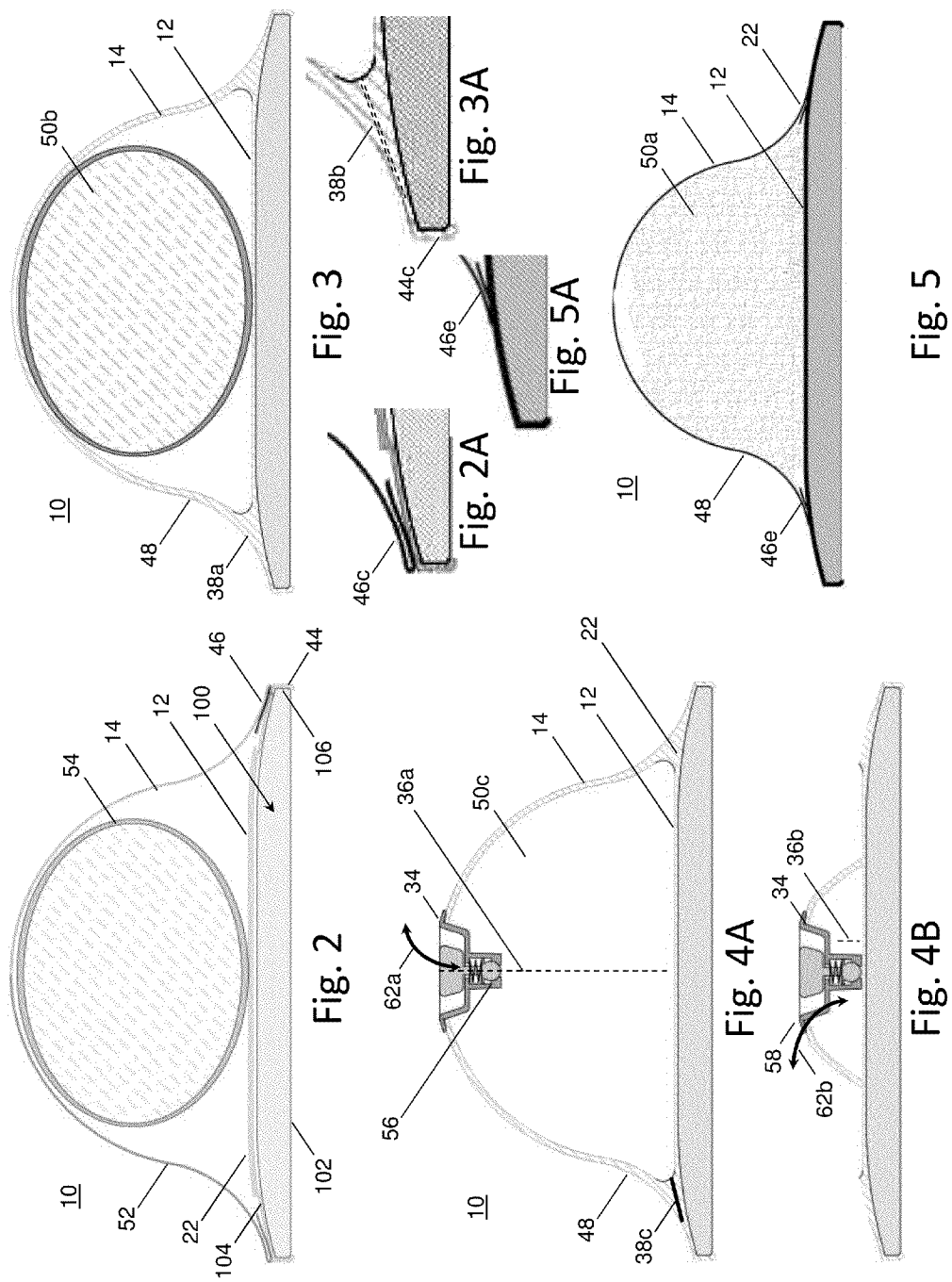

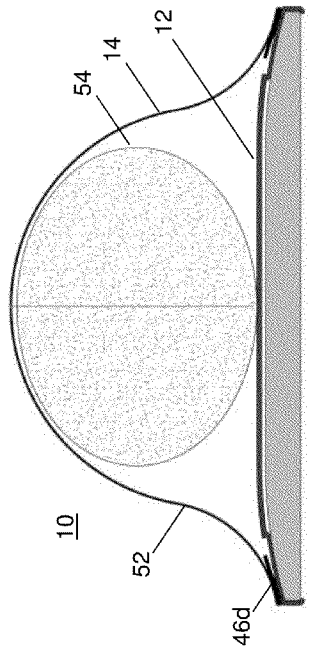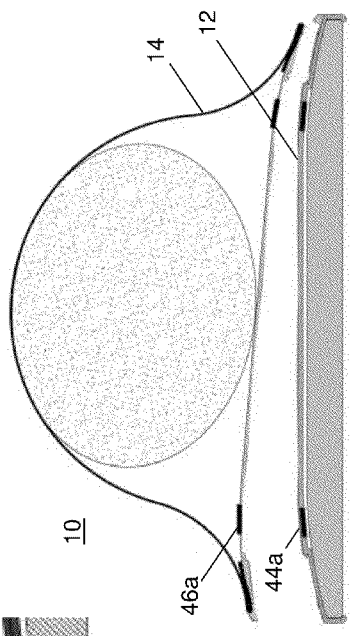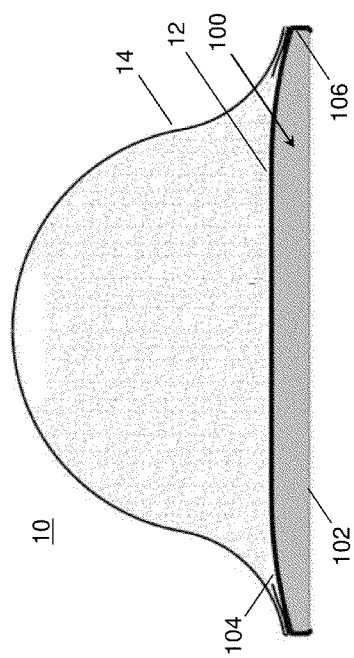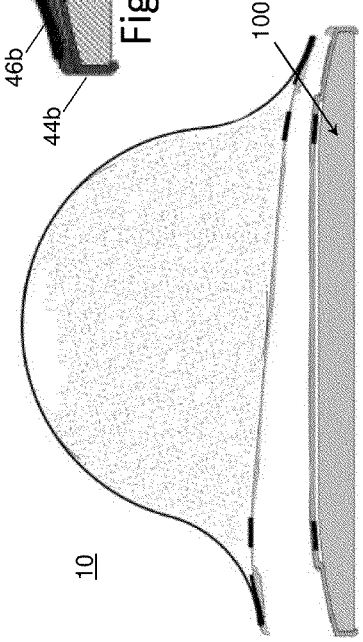

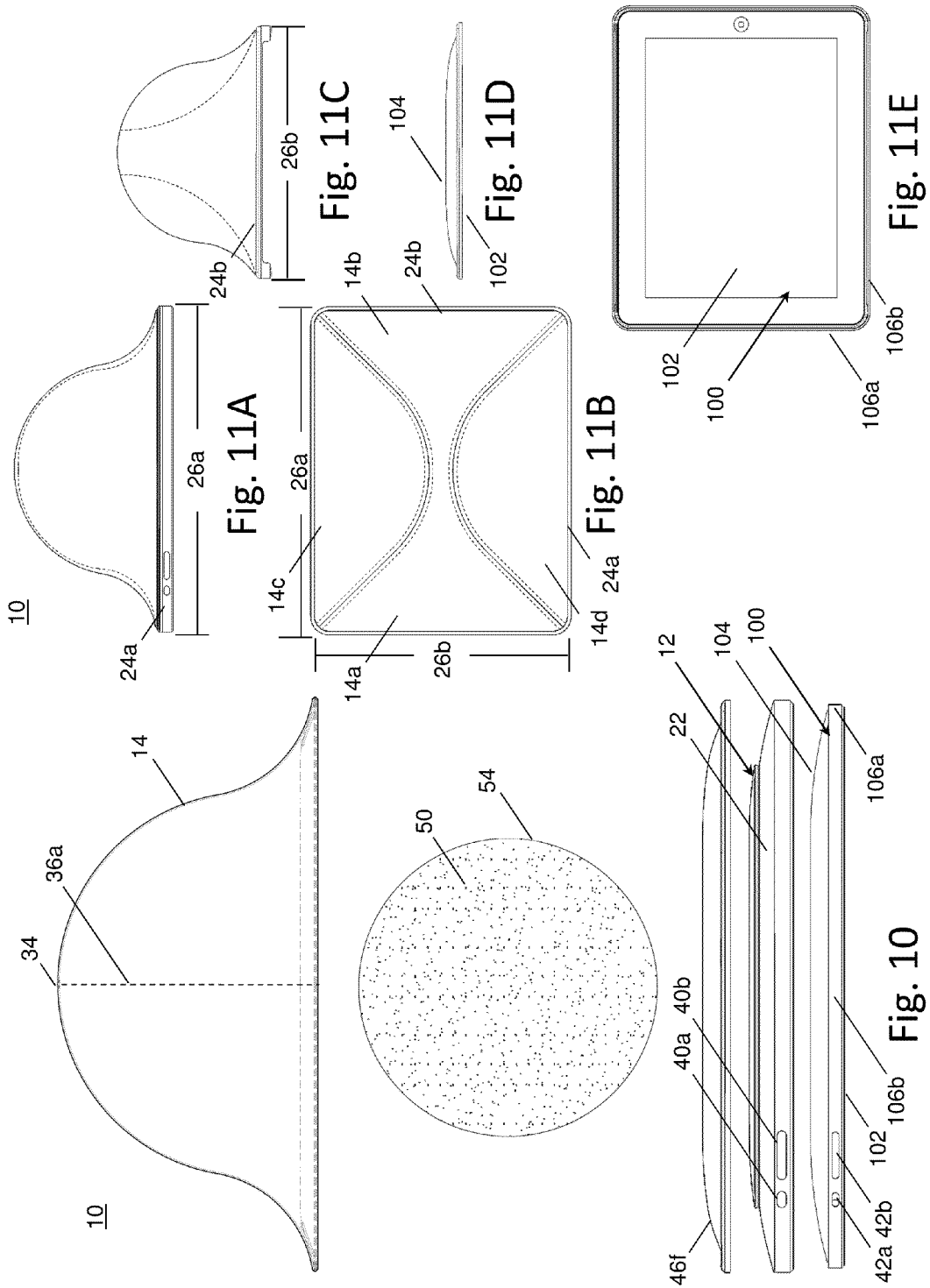

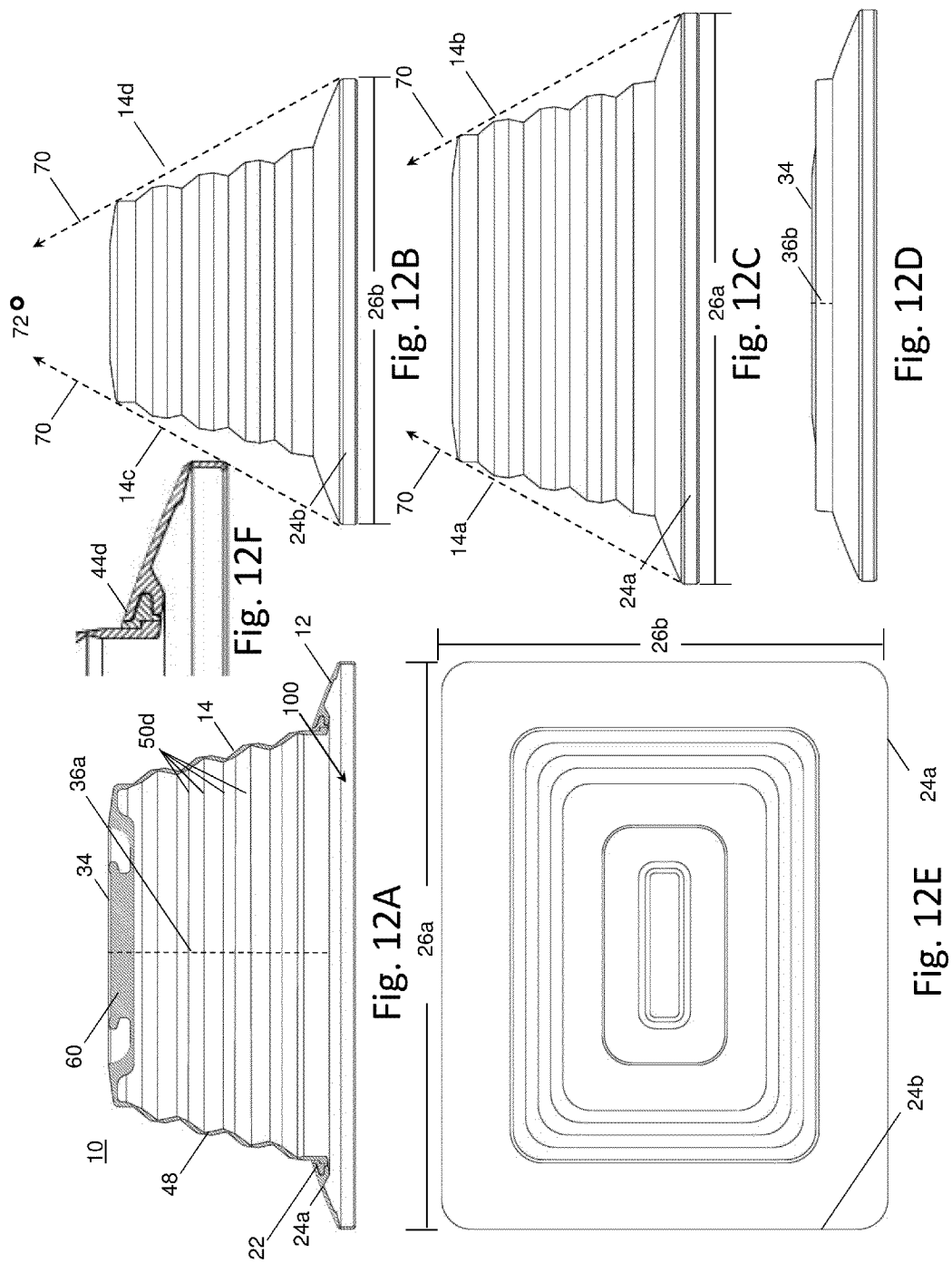

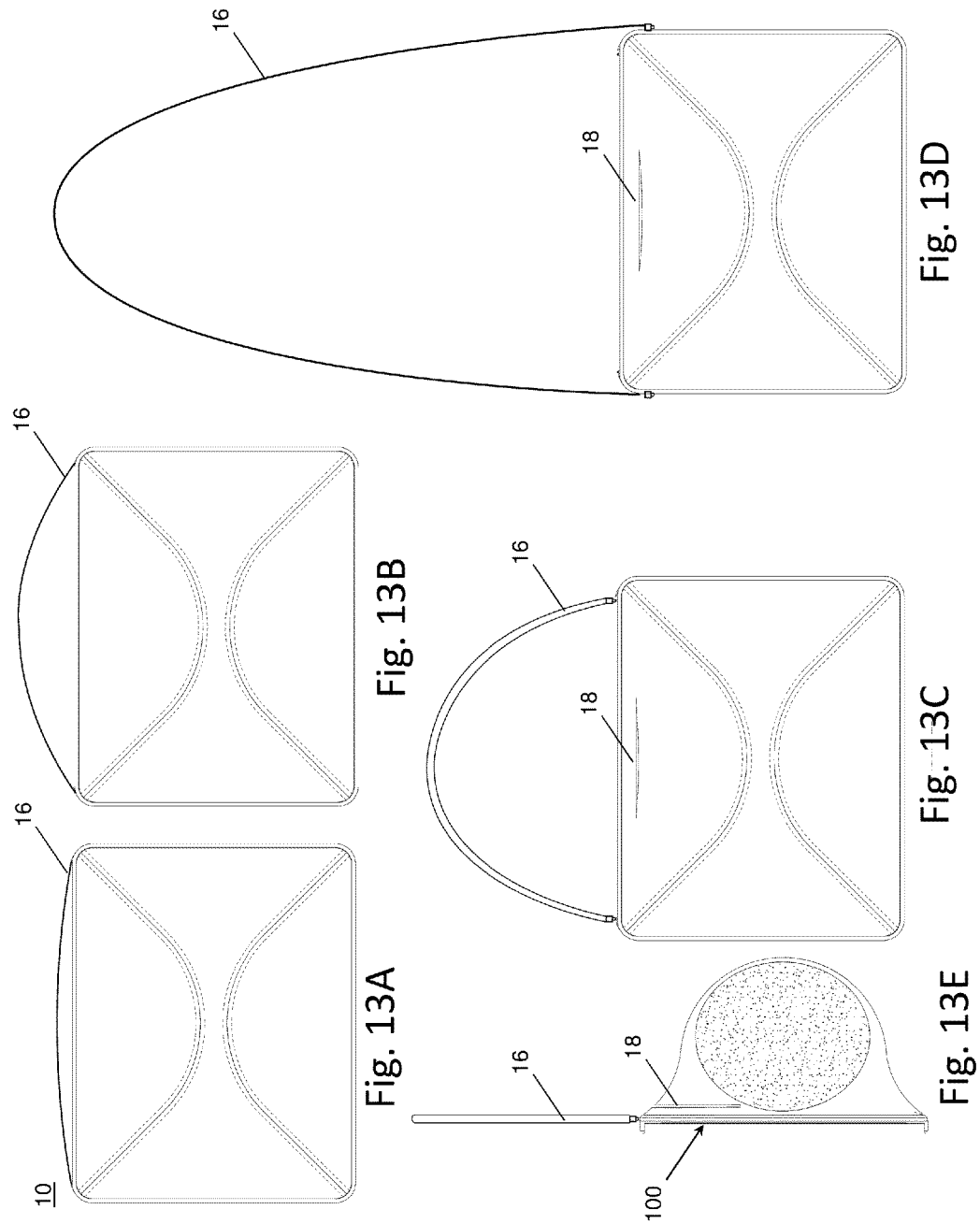

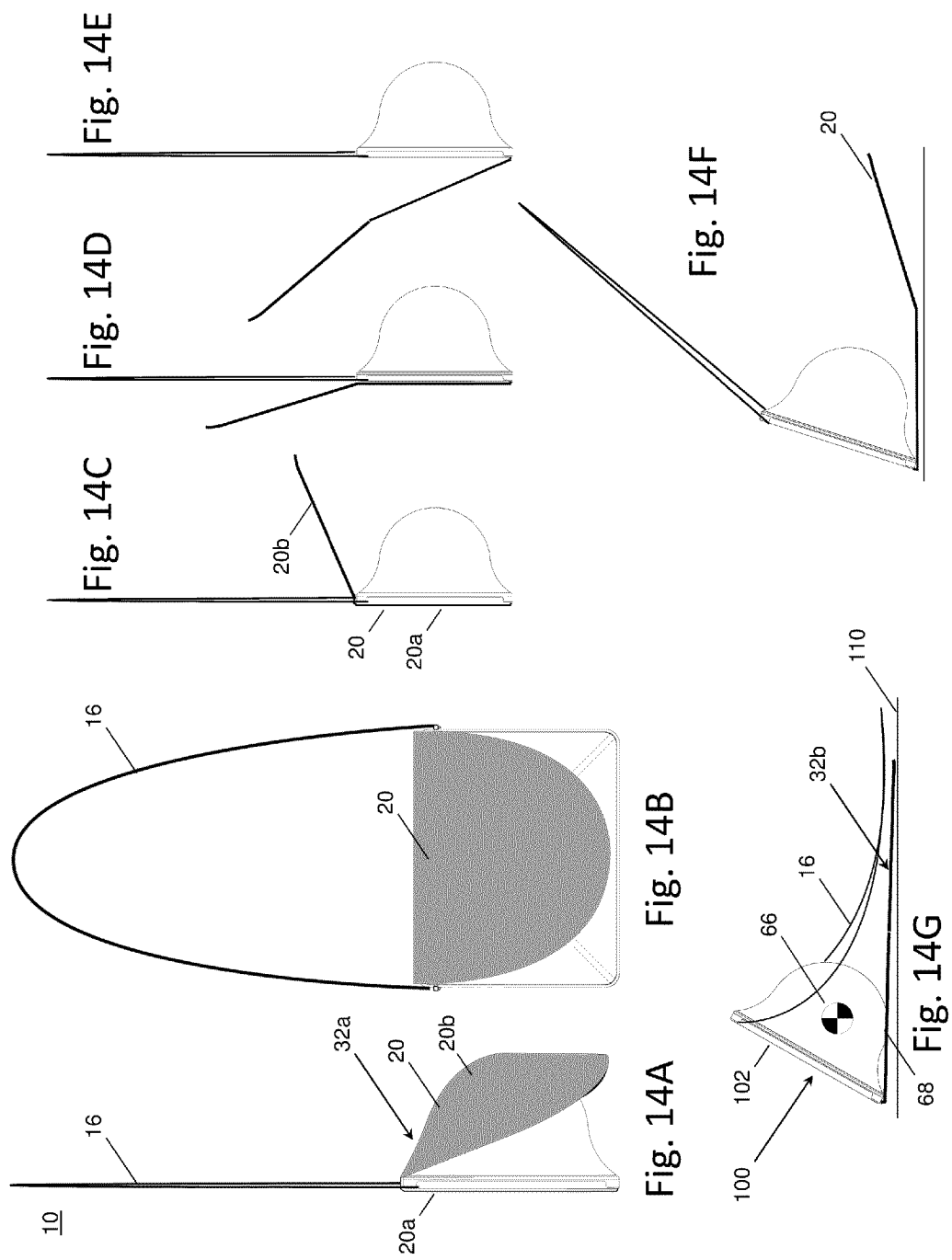

CONFORMABLE COMPUTER HOLDER

CROSS-REFERENCE TO RELATED APPLICATIONS

This application claims priority from U.S. Provisional Patent Application No. 61/345,247 filed May 17, 2010.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to a computer holder, and more particularly to a conformable computer holder that steadies the computer on any surface that is flat or irregularly shaped and which has adjustability in multiple directions.

2. Related Art

Lap desks are known. For example, a portable desk is disclosed in U.S. Pat. No. 4,052,944. The lower portion of the desk is a pillow-like portion of flexible material which forms a yieldable container which is partially filled with a dry, flowable material, such as expanded styrofoam beads, particles or similar materials. The casing portion is secured at the top to a piece of sub-covering which is secured to a hard material by adhesive, glue or other similar attachments. The styrofoam beads can shift to allow the pillow-like portion to adjust to the contour of the surface on which it is to be used. An upstanding abutment secured along one side of the desk top forms a stop for books, pencils and similar items to rest against.

As computers have become smaller and portable, such desks have been used to support such computers. For example, U.S. Pat. No. 5,623,869 discloses a lap table for a portable computer. The lap table has a supple main body with top surface joined to a bottom surface and a sealed hollow interior for containing a filling material which gives the main body a degree of rigidity that is sufficient to support the portable computer. The filling material may be either an inflating gas or styrofoam beads. The lap table has a wall on the top surface that secures the portable computer to the top surface. However, the base portion of these lap table designs usually flare outwardly, with the sides of the base being in a diverging configuration, to keep the table top horizontal or are otherwise configured to keep the table relatively flat to the horizontal plane or generally parallel to the surface on which the table is resting.

Other types of stands are typically used to hold laptop computers at an angle to the user. Typically, these stands are designed to be placed on a firm horizontal surface, such as a table and so they either have a rigid base rather than a pillow-like or supple base, such as the stand described in the patent application published as US Pub. No. 2009/0179132, or the base portion of the stands maintains the same relative planform shape as the surface on which the computer rests or is held in place, or flares out from the sides as discussed above, such as the stands described in the patent application published as US Pub. No. 2005/0072893.

SUMMARY OF THE INVENTION

The present invention is for a holder that is used to steady a computer on a supporting surface, where the computer has a front screen side, a back housing side and peripheral sides. The holder has a case and a conformable backing connected to the case. The holder has an attachment portion that is connected to the computer and is configured as a shell to the computer housing. The pair of longitudinal sides having a length size and a pair of lateral sides have a width size.

The conformable backing extends from the longitudinal and lateral sides away from the computer housing to a distal end which is spaced from said case and is inward from the sides. When the case is positioned at an angle, the distal end is at a distance that is further from the case than when than when the case is in a flat position. The spaced distal end has a maximum distance greater than one half of the shell width size and a minimum distance adjacent to the case.

The conformable backing has a membrane that can be partially filled with conformable solids, a low viscosity liquid, or a gas, or that has a number of foldable bellows that is at least partially filled with a gas.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 1A-1H are side views of the computer holder in various positions with a conformable backing in corresponding arrangements.

FIG. 2 is a cross-sectional end view of the computer holder in FIG. 1A with a case removably attached to the conformable backing with an outer membrane and an inner bladder.

FIG. 2A is a cross-sectional view of a snap-on attachment at a peripheral end of the computer holder in FIG. 2.

FIG. 3 is a cross-sectional end view of the computer holder in FIG. 1A with a case integrally formed with the conformable backing with the outer membrane and inner bladder.

FIG. 3A is a cross-sectional view of a sewn attachment at a peripheral end of the computer holder in FIG. 3.

FIGS. 4A and 4B are cross-sectional end views of the case integrally formed with the membrane having a valve.

FIG. 5 is a cross-sectional end view of the computer holder in FIG. 1A with the case removably attached to a lower aspect ratio membrane without any inner bladder.

FIG. 5A is a cross-sectional view of a hook and loop attachment at a peripheral end of the computer holder in FIG. 5.

FIG. 6 is a cross-sectional end view of the computer holder in FIG. 1A with the case removably attached to the membrane without any inner bladder.

FIG. 7A is a cross-sectional end view of the computer holder in FIG. 1A with a protective case.

FIG. 7B is a cross-sectional end view of the computer holder in FIG. 1A with the protective case and a conformable backing with clips for attachment to the case.

FIGS. 8 & 9 are cross-sectional end views of the computer holder in FIG. 1A with magnets in the protective case and the conformable backing.

FIG. 10 is an exploded view of the computer holder in FIG. 1A.

FIGS. 11A-11E are alternative views of the computer holder in FIG. 1A.

FIGS. 12A-12D are views of an alternative embodiment of the computer holder according to the present invention.

FIGS. 13A-13E are views of the computer holder in FIG. 1A with carrying straps and a pocket.

FIGS. 14A-14G are views of the computer holder in FIG. 1A with a carrying strap and a cover.

DETAILED DESCRIPTION OF THE PREFERRED EMBODIMENTS

The following description of the preferred embodiment(s) is merely exemplary in nature and is in no way intended to limit the invention, its application, or uses.

As illustrated in FIG. 1, the computer holder 10 is used for steadying a computer 100 on a supporting surface 110 which may be flat 110a or irregular 110b. The computer has a front screen side 102, a back housing side 104 and peripheral sides 106a, 106b. As illustrated in the drawings, the present invention is shown in combination with a tablet computer 100. It will be appreciated that the holder 10 described by the present invention can also be adapted for use as a laptop computer cushion as well as other applications where flexible positioning and adjustment for improved viewing angle of various devices is needed, especially interactive devices in which the holder frees the user's hands to manipulate, operate or otherwise interact with the devices' interfaces.

The holder 10 of the present invention has two primary components, a protective case 12 and the conformable backing 14 which is attached to the case. The case 12 holds the computer tablet 100 and is preferably made of injection molded plastic, injection molded silicone, various types of metal or similar rigid or semi-rigid materials. The backing can be formed as a soft membrane 48 as illustrated in FIGS. 1A-1E and FIGS. 2-11 or as an accordion-like bellows 50d as illustrated in FIGS. 1F and 1G and FIG. 12. The backing 14 is preferably made of a sewn fabric, leather and other similar soft materials, and may alternatively be made of injection molded silicone, and the fabric can also be stretchable. The space within the backing can be filled with small filling materials 50a, a low viscosity fluid 50b or filled with a gas 50c such as air. The small filling materials 50a can be any number of conforming solid materials, such as plastic balls, buckwheat, beans, and/or any other loose filling materials. As discussed with reference to FIG. 4A below, a two way valve 56 can be attached to the backing 14 to allow a controlled flow 62a and capture of the gas, particularly the introduction, containment and evacuation of air.

The case 12 has an attachment portion that is connected to the computer 100 and is configured as a shell 22 to the computer housing 104. As particularly shown in FIGS. 11A, 11B and 11C, the shell's sides 24a, 24b have a length size 26a and a width size 26b that correspond with the size of the computer being held. As discussed in detail below, the case 12 can adhere or attach to the back of the computer 100 in a number of different ways. The shell 22 can correspond with the fittings for all tablet computers on the market and is easily adaptable with any fittings that may be incorporated into future computers. The backing 14 is conformable because it is designed to conform to different surfaces, taking on different shapes when the holder 12 is being used. The backing is It can however, return to its inherent shape when not in use.

The conformable backing 14 can be removably attached to the case 12 as shown in FIG. 2 or can be permanently connected to the case 12 as shown in FIG. 3. Regardless of the attachment between the conformable backing and the case, the backing extends from more than one of the case sides 24 away from the computer housing 104 to a distal end 34 that is spaced from the case at a desired distance 28a when the case is in an extended position 30a and a shorter distance 28b when the case is in a flattened position 30b. The conformable backing sides 14a, 14b, 14c, 14d are disposed in a converging arrangement 70 relative to each other toward a distal point 72 that is beyond the distal end 34.

As illustrated in FIG. 13, the holder 10 can also include a strap 16 connected to the case 12 or it can have a pocket 18 or other compartment located between the case 12 and the conformable backing 14. The attachable strap can vary in length and when combined with pockets and the cover 20 shown in FIG. 14, the computer holder 12 can serve as a carrying bag with fashionable looks. The strap and pocket provide secondary functionality for the holder 10 to serve as a woman's purse or a man's bag. The pocket may hold credit cards, money and other personal effects and items and may include a closure to keep the contents of the pocket from falling out. The closure can be a zipper, hook and loop fastener, or any other closure means.

The cover 20 is also functional, serving to protect the computer's screen 102 and the conformable backing 14. The cover 20 is connected to the case 12 and has a folded position 32a with one section 20a covering the screen 102 and another section 20b covering the conformable backing 14. To use the computer, the cover 20 is moved to its unfolded position 32b uncovering the screen and the conformable backing.

As particularly shown in FIGS. 10 and 11, the case sides preferably include at least one longitudinal side 24a and a pair of lateral sides 24b forming the shell 22. The case 12 is substantially adjacent to the computer housing 104 and the shell 22 is proximate to the periphery 106 of the computer housing. The shell 22 extends across at least a portion of the computer housing and a plurality access ports 40a, 40b corresponding with utility ports 42a and interface ports 42b on the computer. With the width size of the shell's sides 26b defined and particularly shown in FIGS. 4A and 12A, it will be appreciated that the spaced distal end 34 of the conformal backing 14 has a maximum distance 36a approximately equal to or greater than one half of the shell width size. Also, with reference to FIGS. 4B and 12D, the spaced distal end 34 has a minimum distance 36b adjacent to the case 12.

As particularly shown in the various illustrations, particularly the detail drawings, there are a number of alternative attachment devices 44 that can be used to removably affix the case 12 to the computer 100. Examples of currently known case attachments include magnetic attachments 44a, clip-on attachments 44b, slide-on attachments 44c, snap-on attachments 44d, and hook and loop attachments (not shown). It will be appreciated that other attachment means that are now known or developed in the future can be incorporated into the case attachment portion without departing from the scope of the present invention.

The case 12 securely holds the computer tablet 100 by its sides and/or back exposing the screen and control buttons on the side of the computer tablet to allow for easy control. The backing snaps or slides onto the case and securely connects the backing with the case. The filled backing allows to position the assembly on most surfaces, like your lap or leg or on a table top, or even uneven surfaces, allowing the device to be positioned in various viewing angles for a more ergonomic and comfortable interaction with the computer tablet.

The conformable backing 14 can be fixedly connected to the case 12 through a permanent fixation 38, such as an integral formation 38a, a sewn attachment 38b, and a glued attachment 38c. Alternatively, the conformable backing can be connected to the case 12 through a removable attachment 46. Examples of removable attachment devices include magnetic attachments 46a, clip-on attachments 46b, slide-on attachments 46c, snap-on attachments 46d, hook and loop attachments 46e, and a frame 46f. It will be appreciated that these examples are not an exhaustive list of connection hardware and fasteners that could be used for the permanent fixations 38 and the removable attachments 46; accordingly any other connection means or fasteners that are now known or developed in the future can be incorporated into the holder's permanent fixations 38 and the removable attachments 46 without departing from the scope of the present invention.

As indicated above, the conformable backing 14 has a membrane 48 that can be partially filled with conformable solids 50a, a low viscosity liquid 50b, or a gas 50c, or that has a number of foldable bellows 50d that is at least partially filled with a gas. It will be appreciated that when the bellows is in their fully extended position, the volume of air inside the bellows membrane is significantly greater than when the bellows are in their fully retracted position. In the embodiments shown in FIGS. 2, 3, 7, 9, 10 and 13, the conformable backing 14 has an outer membrane 52 and an inner bladder 54 within the outer membrane. The bladder is partially filled with at least one of the conformable solids, the low viscosity liquid and the gas.

The conformable backing 14 may also include a valve 56, a cap 58 and/or a handle 60. As shown in FIG. 4A, the valve 56 provides a sealable pathway 62a into the conformable backing 14 for the gas 50c to be introduced into and evacuated from the conformable backing. The two-way valve 56 can be used in combination with a separate or integral pump (not shown) to rapidly inflate or deflate the membrane 48 or an inner bladder 54 which may alternatively contain the valve. Similarly, as shown in FIG. 4B, the cap 58 provides another sealable pathway 62b into the conformable backing 14 for the liquid and/or the conformable solids to be introduced into and removed from the conformable backing 14. The handle 60 provides a mechanical advantage for adjusting the conformable backing 14. As discussed above, the gas, liquid, solids and bellows can be manipulated to adjust the maximum distance 36a of the distal end 34 away from the case 12. Also the gas, liquid, and solids can be substantially removed from the conformable backing 14 or the bellows can be folded in to produce a minimum distance 36b in which the distal end 34 is adjacent to the case 12.

As particularly illustrated in FIGS. 1A-1G, the conformable backing 14 has a several arrangements 64a, 64b, 64c, 64d, 64e, 64f, 64g, 64h according to the respective positions of the case 12 and the supporting surface 110 that is in contact with the conformable backing. As indicated by these illustrations, the positions can be flat, horizontally elevated on the longitudinal side 24a, vertically elevated on the lateral side 24b, and a diagonally elevated. It will be appreciated that the soft conformable backing 14 has a center-weighted center of gravity (CG) 66 for great balance and provides a fulcrum 68 for which to tilt and move the computer when playing games or otherwise interacting with the computer. It will also be appreciated that the holder 10 of the present invention automatically conforms to uneven surfaces and provides for a center of gravity 66 within the conformable backing 14 and proximate to the fulcrum 68 so that the holder 10 is very stable, even on irregular surfaces 110b or when the holder 10 is securing and stabilizing a computer 100 for a user who is travelling in a moving vehicle, such as an automobile, a boat, a plane or a train.

With regard to the bellows embodiment illustrated in FIGS. 1F, 1G, and 12A-12E, the accordion-like conformable backing is preferably formed from an injection mold using silicon materials. As with the conformable sides 14a, 14b, 14c, 14d of the soft membrane 48, the bellows 50d are preferably angled such that the conformable sides of the bellows are in a converging configuration 70 toward a distal point 72 beyond the distal end 34 and the sides collapse into themselves for compactness. Also, the bellows preferably contain venting holes which permit air to be released as the bellows are pushed inward and allow air to flow into the bladder when the bellows are pulled outward. When the bellows are pulled out into their fully extended position, the bellows back provides vertical and horizontal upright viewing angles for the tablet computer. When the bellows are partially opened, such as when one side is fully or partly closed and particularly illustrated in FIG. 1G, the accordion-like back leans at multiple comfortable typing and reading angles both horizontally and vertically on a flat surface as well as on uneven surfaces.

Method for Adjusting Computer Holder

To adjust a computer holder 10 according to the present invention, the user would slide or snap their computer tablet 100 into/onto the holder and rest it on their lap, on a flat surface such as a table top, or on some irregular surface such as the ground.

With the computer 100 in the holder 10, the conformable backing 14 reduces pressure points and insulates the user from the computer's heat when the computer is supported by the user's body. Also, the holder 10 can keep the computer 100 upright on a desktop or on an uneven surface. With the conformable backing, the screen 102 can be adjusted in multiple directions, horizontally, vertically or even diagonally.

The basic elements of the holder 10 are described above. The conformable case 12 and conformable backing 14 are attached to the computer 100. The conformable backing extends from more than one of the peripheral sides away from the computer housing to a distal end 34. The conformable backing has a membrane configured to contain materials or foldable bellows 50d. The materials can be conformable solids, a low viscosity liquid, a gas, and any combination thereof. The conformable backing also has a valve, a cap or a handle. The valve provides a sealable pathway into the conformable backing for the gas to be introduced into and evacuated from the conformable backing. The cap provides another sealable pathway into the conformable backing for the liquid or the conformable solids to be introduced into and removed from the conformable backing. The handle provides a mechanical advantage for adjusting the conformable backing. The distal end is spaced from the case at a first distance when the conformable backing is in an extended position and a second distance less than the first distance when the case is in a flattened position;

An amount of the materials is adjusted within the conformable backing. The adjusted amount varies the longer distance according to the volume of the materials. Specifically, the adjusted amount reduces the longer distance to be substantially contiguous with the computer housing when the volume of the materials is a substantially eliminated.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, it will be appreciated that the holder 10 of the present invention not only can be made as an all-in-one product with the conformable backing 14 fixedly attached to the tablet holder's hard case 12, but the holder 12 can be produced with a variety of alternative attachment options. As discussed above, the holder can have a hard protective case 12 with a removable conformable backing 14 that allows the hard protective case 12 stay on the tablet computer 100 when the conformable backing 14 is removed. The removable conformable backing 14 can be a quick-release bag that is attached using magnets, snaps or other quick-release fasteners. Thus, the breadth and scope of the present invention should not be limited by any of the above-described exemplary embodiments, but should be defined only in accordance with the following claims appended hereto and their equivalents.

What is claimed is:

1. A holder for steadying a computer on a supporting surface, the computer having a front screen side, a back housing side and peripheral sides, comprising:
   a case with an attachment portion connected to the computer and configured as a shell to
   the computer housing, said shell having plurality of sides with a length size and a width size; and
   a conformable backing connected to said case, wherein said conformable backing extends from more than one of said case sides away from the computer housing to a distal end, wherein said distal end is spaced from said case at a first distance when said case is in an angled position and a second distance less than said first distance when said case is in a flat position, wherein said conformable backing has a plurality of arrangements according to a plurality of positions of said case and the supporting surface in contact with said conformable backing, wherein said positions are comprised of a flat position, a horizontal position, a vertical position, and a diagonal position, wherein said conformable backing provides a fulcrum for the holder on the supporting surface and comprises a center of gravity between said distal end and the computer housing, wherein said center of gravity is proximate to said fulcrum, and wherein said conformable backing is comprised of a plurality of conformable sides in a converging arrangement toward the distal point, wherein said converging arrangement is comprised of a first section proximate to said case extending inwardly toward said center of gravity and is further comprised of a second section extending away from said case beyond said center of gravity to said distal end.

2. The invention of claim 1, wherein said case sides are comprised of at least one longitudinal side and a pair of lateral sides forming said shell, wherein said case is substantially adjacent the computer housing and wherein said case attachment portion is proximate to the periphery of the computer housing, wherein said shell extends across at least a portion of the computer housing and comprises a plurality access ports corresponding with utility ports and interface ports on the computer.

3. The invention of claim 1, wherein said spaced distal end has a maximum distance approximately equal to said shell width size.

4. The invention of claim 1, wherein said case is fixedly connected to said conformable backing through at least one of an integral formation, a sewn attachment, and a glued attachment, and wherein said case attachment portion is selected from the group of attachment devices consisting of: a magnetic attachment, a clip-on attachment, a slide-on attachment, a snap-on attachment, a hook and loop attachment, glue, tape and any combination thereof.

5. The invention of claim 1, wherein said conformable backing is connected to said case through a removable attachment, and wherein said case attachment portion is selected from the group of attachment devices consisting of: a magnetic attachment, a clip-on attachment, a slide-on attachment, a snap-on attachment, a hook and loop attachment, glue, tape and any combination thereof, wherein said removable attachment is selected from the group of attachment devices consisting of: a magnetic attachment, a clip-on attachment, a slide-on attachment, a snap-on attachment, a hook and loop attachment, a frame and any combination thereof.

6. The invention of claim 1, wherein said conformable backing is selected from the group consisting of: a membrane at least partially filled with a plurality of conformable solids, a membrane at least partially filled with a low viscosity liquid, a membrane at least partially filled with a gas, a membrane with a plurality of foldable bellows and at least partially filled with a gas, and any combination thereof, and wherein said conformable backing provides a fulcrum for the holder on the supporting surface and comprises a center of gravity within said membrane between said distal end and the computer housing, wherein said center of gravity is proximate to said fulcrum.

7. The invention of claim 6, wherein said conformable backing is further comprised of an outer membrane and a bladder within said outer membrane, wherein said bladder is at least partially filled with at least one of said conformable solids, said low viscosity liquid and said gas.

8. The invention of claim 6, wherein said at least conformable backing is further comprised of at least one of a valve, a cap and a handle, wherein said valve provides a first sealable pathway into said conformable backing for said gas to be introduced into and evacuated from said conformable backing, wherein said cap provides a second sealable pathway into said conformable backing for at least one of said liquid and said conformable solids to be introduced into and removed from said conformable backing, wherein said handle provides a mechanical advantage for adjusting said conformable backing, and wherein said second distance can be adjusted through a manipulation of said gas, liquid, solids and bellows according to said corresponding valve, said cap and said handle.

9. The invention of claim 1 further comprising at least one of a strap connected to said case, a pocket located between said case and said conformable backing, and a cover connected to said case, said cover having a folded position with a first portion covering the screen and a second portion covering said conformable backing and an unfolded position uncovering the screen and said conformable backing.

10. A holder for steadying a computer on a supporting surface, the computer having a front screen side, a back housing side and peripheral sides, comprising:
    a case with an attachment portion connected to the computer and configured as a shell to the computer housing, said shell having a pair of longitudinal sides having a length size and a pair of lateral sides having a width size; and
    a conformable backing connected to said case, wherein said conformable backing extends from said longitudinal sides and from said lateral sides to a distal end away from the computer housing in a converging arrangement toward a distal point beyond said distal end, wherein said distal end is spaced from said case at a first distance when said case is in an angled position and a second distance less than said first distance when said case is in a flat position, wherein said conformable backing extends relative to said longitudinal sides of said case, wherein said flat position is a substantially flattened position, wherein said conformable backing provides a fulcrum for the holder on the supporting surface and comprises a center of gravity between said distal end and the computer housing, wherein said center of gravity is proximate to said fulcrum, and wherein said conformable backing is comprised of a plurality of conformable sides in said converging arrangement.

11. The invention of claim 10, wherein said conformable backing is selected from the group of backings consisting of: a membrane at least partially filled with a plurality of conformable solids, a membrane at least partially filled with a low viscosity liquid, a membrane at least partially filled with a gas, a membrane with plurality of foldable bellows, and any combination thereof, and wherein no portion of said backings flare outwardly away from said converging arrangement beyond said longitudinal sides and lateral sides of said case.

12. The holder of claim 10, further comprising a pocket between said distal end and at least one of said longitudinal sides and said lateral sides.

13. The holder of claim 10, wherein said conformable backing has a plurality of arrangements according to a plurality of positions of said case and the supporting surface in contact with said conformable backing, wherein said positions are comprised of a flat position, an elevated position, and an intermediate position, wherein said distal end is spaced from said case at a first distance when said case is in an elevated position, a second distance less than said first distance when said case is in a flat position, and a third distance less than the first distance and greater than the second distance when said case is in the intermediate position, said center-weighted center of gravity and fulcrum permitting said holder to transition from one of said positions to another of said positions while said holder supports the computer on the supporting surface.

14. The holder of claim 10, wherein said conformable sides in said converging arrangement are selected from the group of sides consisting of a longitudinal pair of said conformable sides, a lateral pair of said conformable sides, at least one longitudinal conformable side in combination with at least one lateral conformable sides, and said longitudinal pair of conformable sides in combination with said lateral pair of said conformable sides, wherein said conformable sides and said converging arrangement form a first conformable backing configuration with said case in said angled position relative to the supporting surface and a second conformable backing configuration with said case in said flattened position, wherein said angled position is formed between the supporting surface and at least one of said longitudinal conformable sides and said lateral conformable sides.

15. The holder of claim 13, wherein said conformable sides and said converging arrangement form a third conformable backing configuration, wherein said angled position is formed between the supporting surface and said longitudinal conformable sides in said first conformable backing configuration, and wherein said angled position is formed between the supporting surface and said lateral conformable sides in said third conformable backing configuration.

16. A holder for steadying a computer on a supporting surface, the computer having a front screen side, a back housing side and peripheral sides, comprising:
a case with an attachment portion connected to the computer and configured as a shell to the computer housing, said shell having pair of longitudinal sides having a length size and a pair of lateral sides having a width size; and
a conformable backing connected to said case, wherein said conformable backing comprises a plurality of outer sides; wherein each of said outer sides extends inwardly from said longitudinal sides and from said lateral sides proximate to said case toward a center of gravity of said conformable backing and each of said outer sides further extends away from said case to a distal end spaced away from the computer housing in a converging configuration toward a distal point beyond said distal end, wherein said conformable backing has a plurality of arrangements according to a plurality of positions of said case and the supporting surface in contact with said conformable backing, wherein said positions are comprised of a flat position, a horizontal position, a vertical position, and a diagonal position, wherein said conformable backing provides a fulcrum for the holder on the supporting surface and comprises a center of gravity between said distal end and the computer housing, wherein said center of gravity is proximate to said fulcrum, and wherein said conformable backing, is comprised of a plurality of conformable sides in a converging arrangement toward the distal point, wherein said converging arrangement is comprised of a first section proximate to said case extending inwardly toward said center of gravity and is further comprised of a second section extending away from said case beyond said center of gravity to said distal end.

17. The invention of claim 16, wherein no portion of said outer sides of said conformable backing flares outwardly away from said center of gravity beyond said longitudinal sides and lateral sides of said case, wherein said distal end is spaced from said case at a first distance when said case is in an angled position and a second distance less than said first distance when said case is in a flat position.

18. The holder of claim 16, wherein said conformable sides in said converging arrangement are selected from the group of sides consisting of a longitudinal pair of said conformable sides, a lateral pair of said conformable sides, at least one longitudinal conformable side in combination with at least one lateral conformable sides, and said longitudinal pair of conformable sides in combination with said lateral pair of said conformable sides, wherein said conformable sides and said converging arrangement form a first conformable backing configuration with said case in said angled position relative to the supporting surface and a second conformable backing configuration with said case in said flattened position, wherein said angled position is formed between the supporting surface and at least one of said longitudinal conformable sides and said lateral conformable sides.

19. The holder of claim 16, wherein said conformable backing further comprises a pocket between said distal end and at least one of said outer sides.

20. A holder for steadying a computer on a supporting surface, the computer having a front screen side, a back housing side and peripheral sides, comprising:
a case with an attachment portion connected to the computer and configured as a shell to the computer housing, said shell having a pair of longitudinal sides having a length size and a pair of lateral sides having a width size; and
a conformable backing connected to said case, wherein said conformable backing extends from said longitudinal sides and from said lateral sides to a distal end away from the computer housing in a converging arrangement toward a distal point beyond said distal end, wherein said distal end is spaced from said case at a first distance when said case is in an angled position and a second distance less than said first distance when said case is in a flat position, wherein said distal end is spaced from said case at a first distance when said case is in an angled position and a second distance less than said first distance when said case is in a flat position, wherein said conformable backing has a plurality of arrangements according to a plurality of positions of said case and the supporting surface in contact with said conformable backing, wherein said positions are comprised of a flat position, a horizontal position, a vertical position, and a diagonal position, wherein said conformable backing provides a fulcrum for the holder on the supporting surface and comprises a center of gravity between said distal end and the computer housing, wherein said center of gravity is proximate to said fulcrum, and wherein said conformable backing is comprised of a plurality of conformable sides in a converging arrangement toward the distal point, wherein said converging arrangement is comprised of a first section proximate to said case extending inwardly toward said center of gravity and is further comprised of a second section extending away from said case beyond said center of gravity to said distal end.

* * * * *